(12) United States Patent
Minamikawa et al.

(10) Patent No.: US 12,155,805 B2
(45) Date of Patent: Nov. 26, 2024

(54) CONSUMING DEVICE OPERATING WHILE CONSUMING CONSUMABLE AND CONSUMPTION MANAGEMENT SYSTEM INCLUDING SERVER AND THE CONSUMING DEVICE

(71) Applicant: BROTHER KOGYO KABUSHIKI KAISHA, Nagoya (JP)

(72) Inventors: Shunsuke Minamikawa, Nagoya (JP); Koichi Tsugimura, Nagoya (JP); Taichiro Kimoto, Nagoya (JP); Yushi Deura, Nagoya (JP); Yuki Kitahashi, Setagaya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/451,546

(22) Filed: Aug. 17, 2023

(65) Prior Publication Data
US 2024/0064258 A1 Feb. 22, 2024

(30) Foreign Application Priority Data

Aug. 19, 2022 (JP) .................. 2022-131256
Aug. 9, 2023 (JP) .................. 2023-130332

(51) Int. Cl.
*H04N 1/34* (2006.01)
*H04N 1/32* (2006.01)

(52) U.S. Cl.
CPC ......... *H04N 1/344* (2013.01); *H04N 1/32673* (2013.01); *H04N 1/346* (2013.01)

(58) Field of Classification Search
None
See application file for complete search history.

(56) References Cited

U.S. PATENT DOCUMENTS

2016/0011554 A1 1/2016 Shipman et al.
2022/0100438 A1 3/2022 Hattori
2022/0137891 A1 5/2022 Kawaguchi et al.

FOREIGN PATENT DOCUMENTS

JP 2021-018621 A 2/2021

OTHER PUBLICATIONS

Extended European Search Report issued in corresponding European Patent Application No. 23192094.3, Dec. 19, 2023.

*Primary Examiner* — Lennin R Rodriguezgonzalez
(74) *Attorney, Agent, or Firm* — Merchant & Gould P.C.

(57) ABSTRACT

In a consuming device, a controller is configured to perform, when an operating mode is set to a non-billing mode: executing. The executing executes, in response to receiving an execution instruction, a prescribed operation consuming a consumable. The prescribed operation is executed while consuming the consumable irrespective of a permitted consumption quantity without decreasing the permitted consumption quantity. The controller is configured to perform: when the operating mode is set to a billing mode: acquiring; and executing. The acquiring acquires the permitted consumption quantity including a newly purchased consumption quantity paid for by a user. The executing executes, in response to receiving the execution instruction, the prescribed operation. The prescribed operation is executed while consuming the consumable and decreasing the permitted consumption quantity acquired in the acquiring until the decreased permitted consumption quantity reaches a predetermined quantity.

12 Claims, 9 Drawing Sheets

CONSUMING DEVICE OPERATING WHILE CONSUMING CONSUMABLE AND CONSUMPTION MANAGEMENT SYSTEM INCLUDING SERVER AND THE CONSUMING DEVICE

REFERENCE TO RELATED APPLICATIONS

This application claims priorities from Japanese Patent Application No. 2022-131256 filed on Aug. 19, 2022 and Japanese Patent Application No. 2023-130332 filed on Aug. 9, 2023. The entire content of each of these priority applications is incorporated herein by reference.

BACKGROUND ART

According to a known conventional technology, printing or other processes are performed on the basis of a permitted quantity the user has purchased for a fee. This conventional technology employs a prepaid system in which the user purchases the permitted quantity by making a monetary payment in advance, and thereafter can print up to the permitted quantity.

DESCRIPTION

In the conventional technology described above, before using a device for the first time, the user pays a fee according to a prepaid system in order to purchase a permitted quantity for using the device. However, there may be a need to apply the prepaid system described above to a device that the user has initially used for no fee, enabling the user to use the device thereafter within the range of a permitted quantity purchased through the prepaid system. To meet such a need, the operating mode of the device must be switched from a mode in which the device is operated at no cost to the user to a mode in which the device is operated within a permitted quantity purchased by the user. The conventional technology described above gives no specific consideration for switching modes in this way.

In view of the foregoing, it is an object of the present disclosure to provide a consuming device, a consumption management system, and a non-transitory computer-readable storage medium storing a set of computer-readable instructions capable of improving user convenience by enabling a device mode to be switched from a mode in which the device operates at no cost to the user to a mode in which the device operates within a permitted quantity corresponding to a user-paid fee.

In order to attain the above and other object, according to one aspect, the present disclosure provides a consuming device. The consuming device includes: a holder; and a controller. The holder is configured to hold therein a consumable. The consuming device is operable in an operating mode. The operating mode is switchable between a billing mode in which the consuming device can consume the consumable within a permitted consumption quantity and a non-billing mode in which the consuming device can consume the consumable without any restriction imposed by the permitted consumption quantity. The controller is configured to perform: (a) setting. The setting in (a) sets the operating mode to one of the billing mode and the non-billing mode. The controller is configured to perform, when the operating mode is set to the non-billing mode in (a): (b) executing. The executing in (b) executes, in response to receiving an execution instruction, a prescribed operation consuming the consumable. The prescribed operation is executed in (b) while consuming the consumable irrespective of the permitted consumption quantity without decreasing the permitted consumption quantity. The controller is configured to perform, when the operating mode is set to the billing mode in (a): (c) acquiring; and (d) executing. The acquiring in (c) acquires the permitted consumption quantity including a newly purchased consumption quantity paid for by a user. The executing in (d) executes, in response to receiving the execution instruction, the prescribed operation. The prescribed operation is executed in (d) while consuming the consumable and decreasing the permitted consumption quantity acquired in (c) until the decreased permitted consumption quantity reaches a predetermined quantity.

The consuming device according to the present disclosure is provided with a billing mode and a non-billing mode. In the billing mode, the consuming device can perform a prescribed operation while consuming the consumable and decreasing the permitted consumption quantity corresponding to the newly purchased consumption quantity paid for by a user until the decreased permitted consumption quantity reaches a predetermined quantity. In the non-billing mode, the consuming device can perform the prescribed operation while consuming the consumable irrespective of the permitted consumption quantity without reducing the permitted consumption quantity. According to the present disclosure, a setting for determining whether the consuming device will operate in the billing mode or the non-billing mode is configured in the setting in (a). Thus, the present disclosure can switch the operating mode from the non-billing mode operable without any financial burden to the user to the billing mode operable within the permitted consumption quantity paid for by the user, thereby improving user convenience.

According to another aspect, the present disclosure also provides a consumption management system. The consumption management system includes: a server; and a consuming device. The consuming device includes: a holder; and a controller. The holder is configured to hold therein a consumable. The consuming device is operable in an operating mode. The operating mode is switchable between a billing mode in which the consuming device can consume the consumable within a permitted consumption quantity and a non-billing mode in which the consuming device can consume the consumable without any restriction imposed by the permitted consumption quantity. The controller is configured to perform: (a) setting. The setting in (a) sets the operating mode to one of the billing mode and the non-billing mode. The controller is configured to perform, when the operating mode is set to the non-billing mode in (a): (b) executing. The executing in (b) executes, in response to receiving an execution instruction, a prescribed operation consuming the consumable. The prescribed operation is executed in (b) while consuming the consumable irrespective of the permitted consumption quantity without decreasing the permitted consumption quantity. The controller is configured to perform, when the operating mode is set to the billing mode in (a): (c) acquiring; and (d) executing. The acquiring in (c) acquires the permitted consumption quantity including a newly purchased consumption quantity paid for by a user. The executing in (d) executes, in response to receiving the execution instruction, the prescribed operation. The prescribed operation is executed in (d) while consuming the consumable and decreasing the permitted consumption quantity acquired in (c) until the decreased permitted consumption quantity reaches a predetermined quantity.

According to still another aspect, the present disclosure also provides a non-transitory computer-readable storage medium storing a set of computer-readable instructions for controlling a printing device. The printing device includes: a holder; and a computer. The holder is configured to hold therein a printing consumable. The printing device is operable in an operating mode. The operating mode is switchable between a billing mode in which the printing device can consume the printing consumable within a permitted printing quantity and a non-billing mode in which the printing device can consume the printing consumable without any restriction imposed by the permitted printing quantity. The set of computer-readable instructions, when executed by the computer, causes the printing device to perform: (a) setting. The setting in (a) sets the operating mode to one of the billing mode and the non-billing mode. The set of computer-readable instructions, when executed by the computer, causes the printing device to perform, when the operating mode is set to the non-billing mode in (a): (b) executing. The executing in (b) executes, in response to receiving an execution instruction, a printing operation consuming the printing consumable. The printing operation is executed in (b) while consuming the printing consumable irrespective of the permitted printing quantity without decreasing the permitted printing quantity. The set of computer-readable instructions, when executed by the computer, causes the printing device to perform, when the operating mode is set to the billing mode in (a): (c) acquiring; and (d) executing. The acquiring in (c) acquires the permitted printing quantity including a newly purchased printing quantity paid for by a user. The executing in (d) executes, in response to receiving the execution instruction, the printing operation. The printing operation is executed in (d) while consuming the printing consumable and decreasing the permitted printing quantity acquired in (c) until the decreased permitted printing quantity reaches a predetermined quantity.

The present disclosure provides a consuming device, a consumption management system, and a non-transitory computer-readable storage medium storing a set of computer-readable instructions capable of improving user convenience by enabling a device mode to be switched from a mode in which the device operates at no cost to the user to a mode in which the device operates within a permitted quantity corresponding to a user-paid fee.

Next, an embodiment of the present disclosure will be described while referring to the accompanying drawings. In this embodiment, a printing device that executes printing operations while consuming ink cartridges will be described as an example of the consuming device that performs a prescribed operation while consuming a consumable, but the consuming device of the present disclosure is not limited to a printing device.

<Overall Configuration of a Printing Management System>

Figure 1:
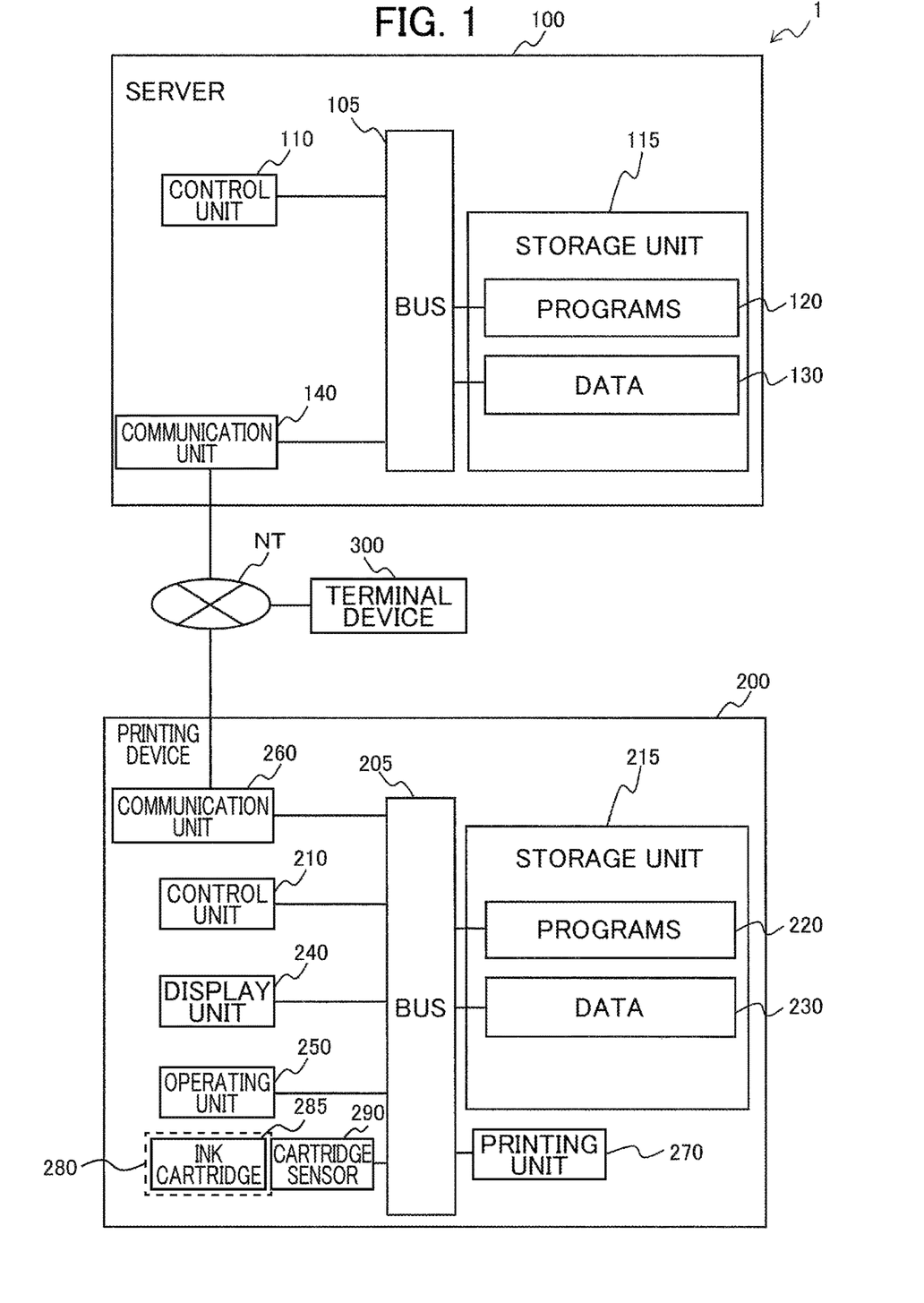
FIG. 1 is a block diagram illustrating the overall configuration of a printing management system.

FIG. 1 illustrates the overall configuration of a printing management system 1 according to the present embodiment. As illustrated in FIG. 1, the printing management system 1 has a server 100, a printing device 200, and a terminal device 300. The server 100, printing device 200, and terminal device 300 can communicate with each other via a network NT. The printing device 200 is an example of the consuming device of the present disclosure, and the printing management system 1 is an example of the consuming management system of the present disclosure.

<Server>

The server 100 is installed and managed by the manufacturer of the printing device 200, for example. The server 100 may be configured as a single standalone "server" or as a "server module" comprising a plurality of servers. The server 100 manages a plurality of the printing devices 200, which are the subjects of management. The server 100 includes a control unit 110, a storage unit 115, a communication unit 140, and the like. The control unit 110, storage unit 115, communication unit 140, and the like are connected via a bus 105 and can exchange information with each other.

The storage unit 115 is configured of RAM, ROM, EEPROM, a hard disk drive, and the like, for example. The storage unit 115 stores various programs 120 and various data 130. The programs 120 include a program for executing a control process on the server 100 according to the sequence chart illustrated in FIG. 4 described later, for example. The data 130 includes a cumulative number of printable sheets, for example, which is a cumulative value indicating the number of printable sheets purchased by the user.

The control unit 110 is a device, such as a CPU or other processor, that performs data processing. The control unit 110 executes the various programs stored in the storage unit 115. The control unit 110 implements various processes, including data communication with the printing device 200 and terminal device 300 connected to the network NT. The communication unit 140 is connected to the network NT and facilitates communication between the printing device 200 and terminal device 300.

<Printing Device>

The printing device 200 is owned by a user, for example. The printing device 200 is configured to be switchable between a billing mode and a non-billing mode. In the billing mode, the printing device 200 executes printing operations while consuming ink from special ink cartridges 285 up to the permitted number of printable sheets. The permitted number of printable sheets is an example of the permitted printing quantity of the present disclosure. In the non-billing mode, the printing device 200 executes printing operations while consuming ink from commercially available ink cartridges 285, for example, without any restriction on the number of printable sheets. The printing device 200 includes a control unit 210, a storage unit 215, a display unit 240, an operating unit 250, a communication unit 260, a printing unit 270, cartridge holders 280, cartridge sensors 290, and the like. The control unit 210, storage unit 215, display unit 240, operating unit 250, communication unit 260, and printing unit 270 are interconnected via a bus 205 and can exchange information with each other.

The storage unit 215 stores various programs 220 and various data 230. The programs 220 include programs for executing control processes on the printing device 200 according to the sequence chart illustrated in FIG. 4 and the flowcharts illustrated in FIGS. 6 through 8 described later, for example. The data 230 includes the cumulative number of printable sheets described above, a cumulative number of printed sheets that is incremented each time printing based on a print job is executed, and image data to be printed, for example.

The control unit 210 is a device, such as a CPU or other processor, that performs data processing. The control unit 210 executes the various programs stored in the storage unit 215. The control unit 210 is an example of the controller and the computer of the present disclosure. The display unit 240 is a liquid crystal display, for example, that can display various information. The operating unit 250 is configured of a keyboard and buttons, for example, and receives input operations from the user. By operating the operating unit 250, the user can input various instructions into the printing device 200. The communication unit 260 is connected to the network NT and enables communications between the server 100 and terminal device 300. The printing unit 270 conveys printing paper with a conveying mechanism (not illustrated) while printing an image on the printing paper according to the inkjet method, for example.

In the present embodiment, the printing device 200 is provided with four cartridge holders 280 for respective ink colors, and each cartridge holder 280 is configured to hold an ink cartridge 285 therein. The ink cartridges 285 include ink cartridges holding ink in the respective colors cyan, magenta, yellow, and black, for example. The printing unit 270 performs printing while consuming ink from the ink cartridges 285. The printing device 200 is also provided with four cartridge sensors 290. Each of the cartridge sensors 290 is provided on a corresponding one of the cartridge holders 280. Each cartridge sensor 290 detects whether an ink cartridge 285 held in the corresponding cartridge holder 280 is a special cartridge or a commercially available cartridge. In the present embodiment, an IC chip (not illustrated) is mounted on each ink cartridge 295. Each of the cartridge sensors 290 reads information from the IC chip mounted on the ink cartridge 285 held in the corresponding cartridge holder 280, and detects whether the ink cartridge 285 is a special cartridge or a commercially available cartridge. Special cartridges are ink cartridges designed for use in the billing mode. The special cartridges are delivered to the user by a shipping service in accordance with a predetermined shipping agreement under the billing mode. Commercially available cartridges are ink cartridges that users purchase and use themselves under the non-billing mode. In the present embodiment, special ink cartridges 285 will be referred to as "special ink cartridges 285" and commercially available ink cartridges 285 will be referred to as "normal ink cartridges 285" as appropriate. The ink cartridges 285 are examples of the consumable and the printing consumable of the present disclosure, and the cartridge holders 280 are examples of the holder of the present disclosure.

<Terminal Device>

The terminal device 300 is a smartphone or other mobile device owned by the user, for example. The terminal device 300 is connected to the network NT through a wireless connection. While not illustrated in the drawings, the terminal device 300 has a control unit, a storage unit, a communication unit for connecting to the network NT, and the like.

The storage unit of the terminal device 300 stores various programs. The programs include a program for executing a control process on the terminal device 300 according to the sequence chart illustrated in FIG. 4 described later, for example. The control unit of the terminal device 300 executes the various programs stored in the storage unit.

The terminal device 300 is configured of a touchscreen that integrally combines a liquid crystal display with a touchpad. The terminal device 300 displays various information and receives various operations inputted by the user. By operating the touchscreen, the user can input various instructions into the terminal device 300. The terminal device 300 may be a device other than a smartphone, such as a tablet computer, a laptop computer, a desktop computer, or the like.

<Printing on the Printing Management System in the Non-Billing Mode and the Billing Mode>

Figure 2:
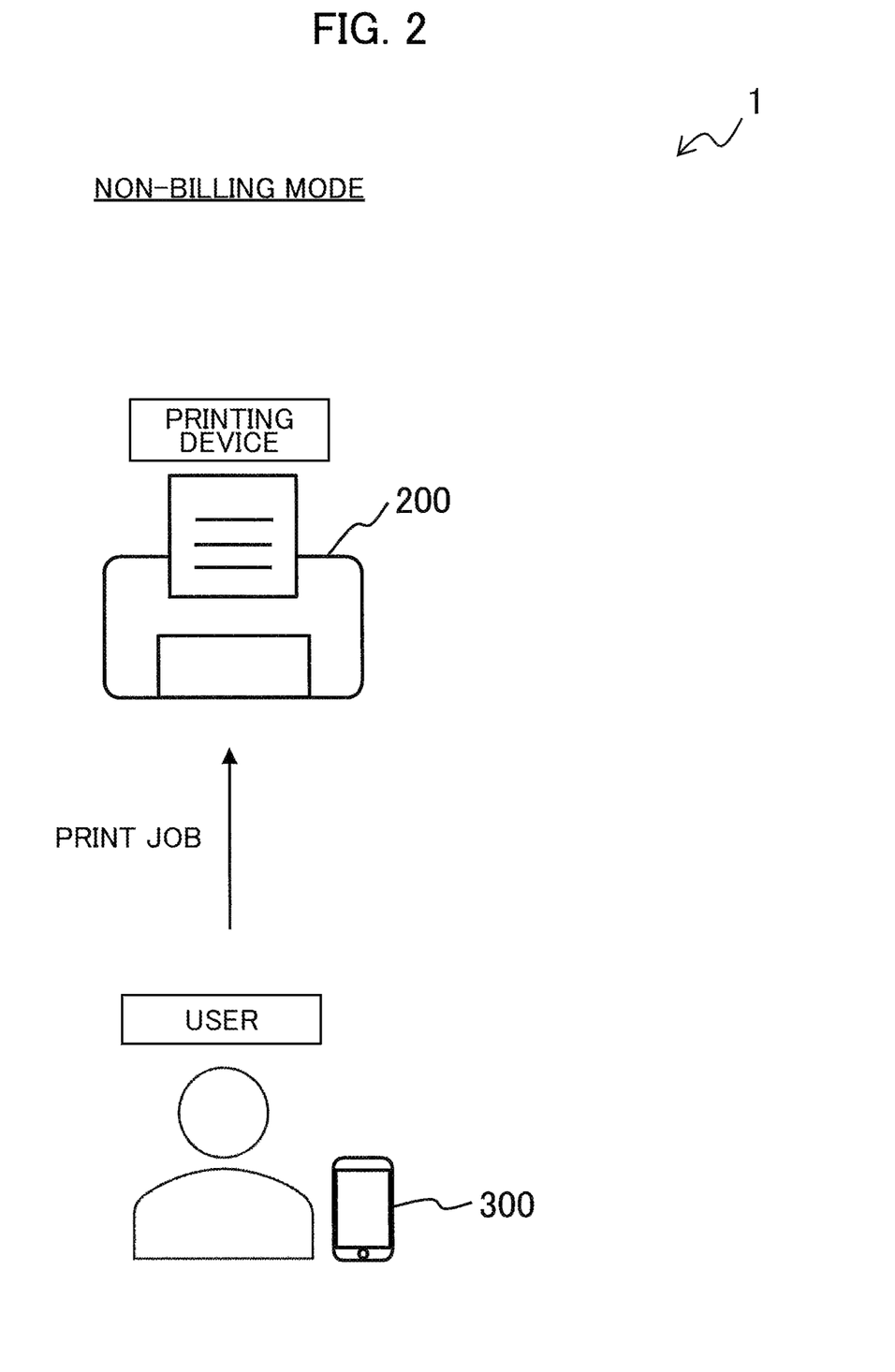
FIG. 2 is an explanatory diagram illustrating an example of printing on the printing management system in a non-billing mode.

As described above, the printing device 200 can be switched between a billing mode and a non-billing mode. In the billing mode, the printing device 200 executes printing operations while consuming ink from special ink cartridges 285 up to a permitted number of printable sheets. In the non-billing mode, the printing device 200 executes printing operations while consuming ink from normal ink cartridges 285 without any restriction on the number of printable sheets. FIG. 2 illustrates an example of printing on the printing management system 1 in the non-billing mode. As illustrated in FIG. 2, when the printing device 200 receives a print job from the user's terminal device 300 while in the non-billing mode, the printing device 200 executes printing based on the print job while consuming ink from the normal ink cartridges 285 without any restriction on the number of printable sheets. When ink in the normal ink cartridges 285 is depleted, the user purchases normal ink cartridges 285 that are commercially available and replaces the depleted normal ink cartridges 285 with the new normal ink cartridges 285. Print jobs are not limited to those received from the terminal device 300 but may be print jobs received in response to user operations on the operating unit 250 of the printing device 200. The print job is an example of the execution instruction of the present disclosure.

Figure 3:
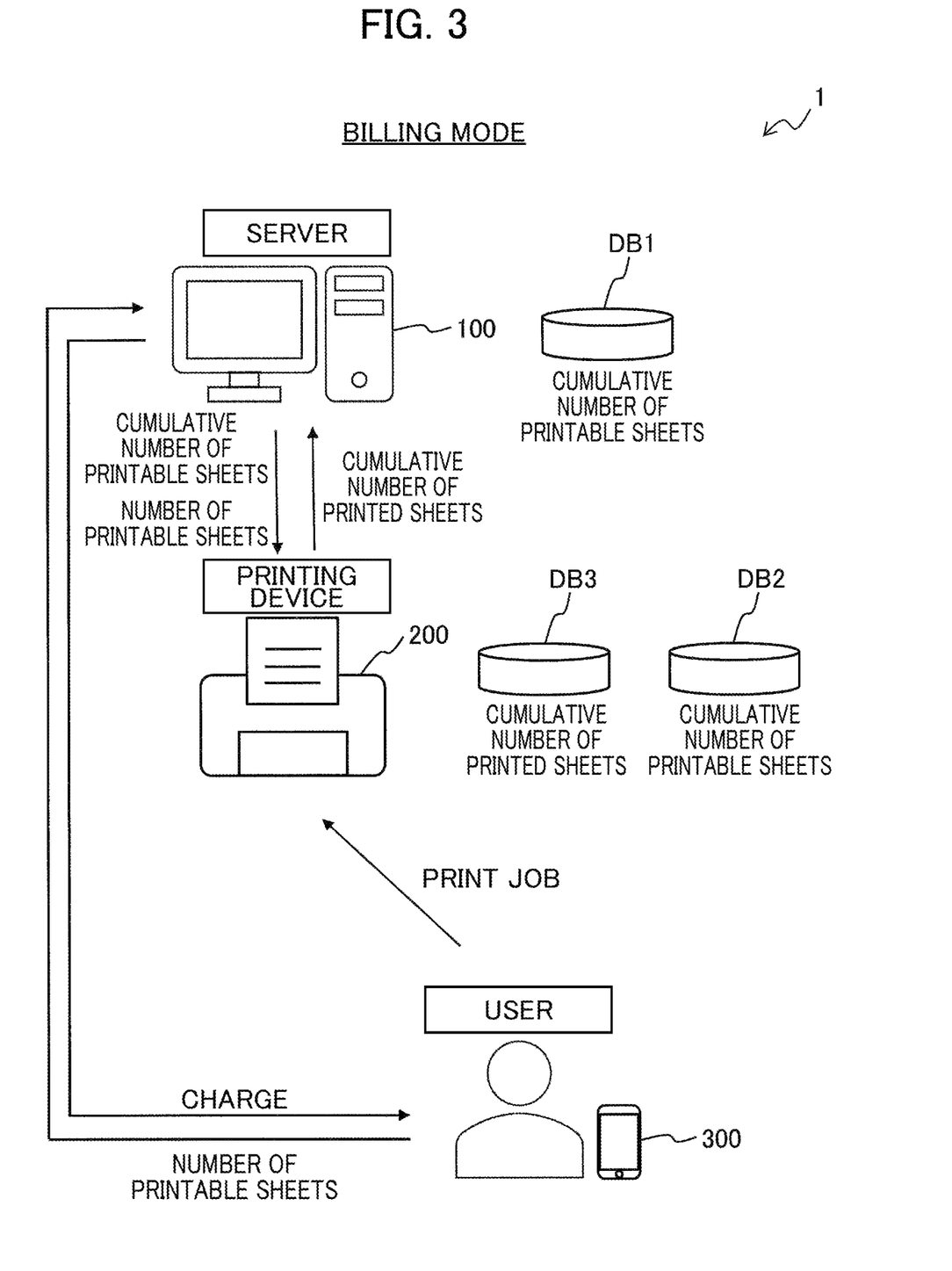
FIG. 3 is an explanatory diagram illustrating an example of printing on the printing management system in a billing mode.

FIG. 3 illustrates an example of printing on the printing management system 1 in the billing mode. As illustrated in FIG. 3, the user pays a fee to purchase a desired number of printable sheets for printing. In other words, the user pays a monetary amount for purchasing the number of printable sheets according to a prepaid system. When requesting to purchase the number of printable sheets through an operation on the terminal device 300, the terminal device 300 transmits identification information for the terminal device 300 and a purchase request for the number of printable sheets to the server 100.

Upon receiving the purchase request, the control unit 110 of the server 100 identifies the printing device 200 having identification information preregistered in association with the identification information for the terminal device 300 and determines whether the printing device 200 identified by this identification information is in the billing mode. When the identified printing device 200 is in the billing mode, the server 100 performs a settlement process to settle payment for the number of printable sheets purchased by the user and adds a value corresponding to the number of printable sheets newly purchased by the user to the cumulative number of printable sheets assigned to the printing device 200. The cumulative number of printable sheets is a cumulative value indicating the number of printable sheets purchased by the user. This cumulative number of printable sheets is stored in a database DB1 provided in the storage unit 115 of the server 100 for each printing device 200 or each user.

The updated cumulative number of printable sheets or the value of newly purchased number of printable sheets is also transmitted to the printing device 200, and the control unit 210 of the printing device 200 updates the cumulative number of printable sheets stored in a database DB2 provided in the storage unit 215 of the printing device 200. Thus, when the server 100 transmits the newly purchased number of printable sheets to the printing device 200, the process of adding the purchased number of printable sheets to the cumulative number of printable sheets is executed by the control unit 210 of the printing device 200.

When the control unit 110 of the server 100 determines that the printing device 200 is not in the billing mode, on the other hand, the control unit 110 notifies the terminal device 300 that the number of printable sheets cannot be purchased. The purchased number of printable sheets is an example of the newly purchased consumption quantity and the newly purchased printing quantity of the present disclosure.

When the printing device 200 receives a print job from the user's terminal device 300, the control unit 210 of the printing device 200 requests and acquires the number of printable sheets from the server 100. The number of printable sheets for the printing device 200 is a value obtained by subtracting the cumulative number of printed sheets described later from the cumulative number of printable sheets. The number of printable sheets may be calculated by the control unit 110 of the server 100 or by the control unit 210 of the printing device 200.

When the number of printable sheets is equal to or greater than one, the control unit 210 executes printing until the number of printable sheets reaches zero. The control unit 210 increments the cumulative number of printed sheets by the number of sheets printed each time printing is executed. Thus, the cumulative number of printed sheets is the total number of sheets the printing device 200 has printed. The cumulative number of printed sheets is stored in a database DB3 provided in the storage unit 215 of the printing device 200. The control unit 210 of the printing device 200 transmits a value for the cumulative number of printed sheets to the server 100 periodically at predetermined transmission timings.

When the printing device 200 receives a print job, the control unit 210 executes a printing operation based on the print job while consuming ink from the ink cartridges 285 and decrementing (decreasing) the number of printable sheets by the number of printed sheets. Print jobs are not limited to those received from the terminal device 300 but may be print jobs received when the user performs operations on the operating unit 250 of the printing device 200.

The control unit 110 of the server 100 executes a billing process periodically at predetermined timings to bill the user of the terminal device 300 an amount based on the value of the cumulative number of printed sheets. A transaction server that is separate from the server 100 may also execute the billing process in response to instructions from the server 100.

<Control Process for Handling a Request to Register a Printing Device>

Figure 4:
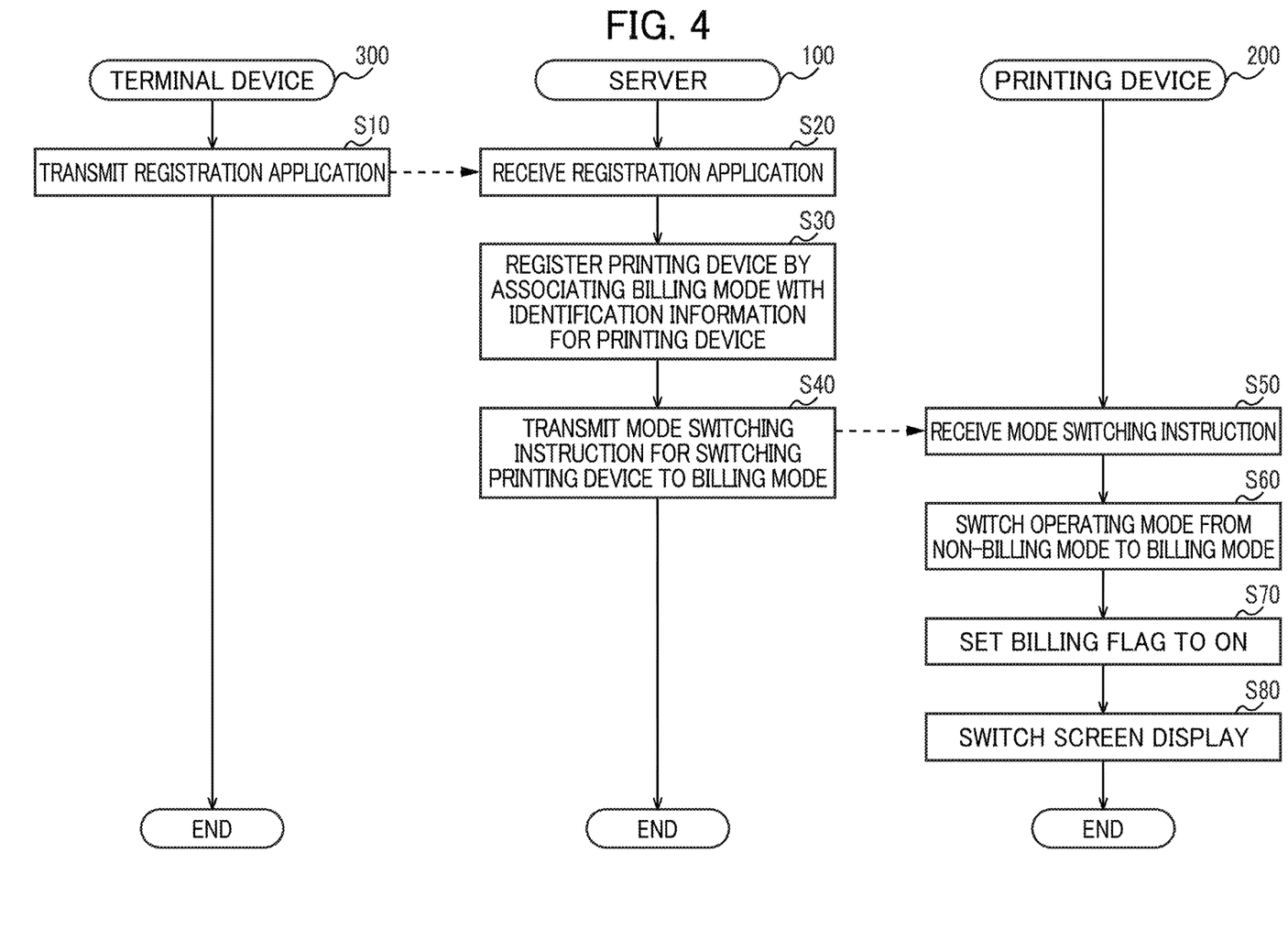
FIG. 4 is a sequence chart illustrating steps in an example of a control process executed by devices in the printing management system when a user issues a request to register a printing device on a server.

When a user has initially been using a printing device 200 in the non-billing mode but later wishes to operate the printing device 200 in the billing mode, the user must register the printing device 200 on the server 100. FIG. 4 illustrates an example of a control process executed by the devices in the printing management system 1 when the user issues a request to register the printing device 200 on the server 100. While steps in the control process illustrated in FIG. 4 are executed by the control units of the respective devices, these steps will be described as being executed by the devices themselves for convenience.

Figure 5:
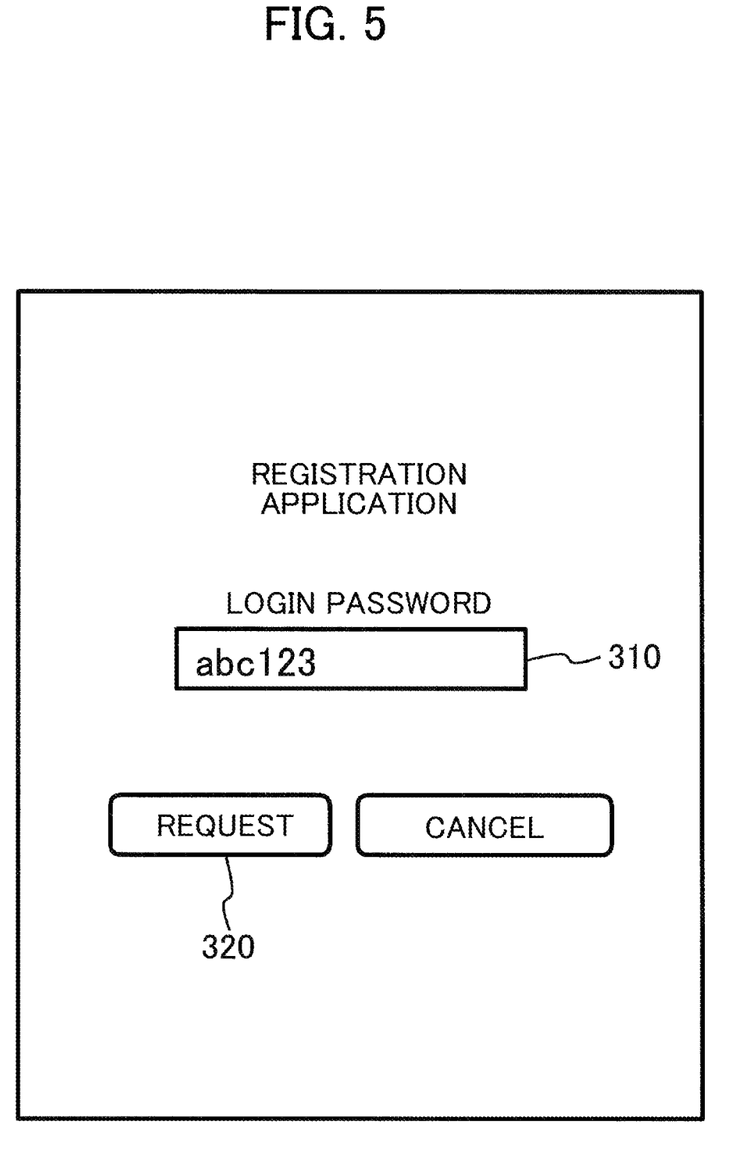
FIG. 5 is an explanatory diagram illustrating an example of a registration application screen displayed on a touchscreen of a terminal device.

In S10 of FIG. 4, in response to prescribed user operations, the terminal device 300 transmits a registration application to the server 100 requesting to use the printing device 200 in the billing mode. FIG. 5 illustrates an example of a registration application screen displayed on the touchscreen of the terminal device 300. In the example of FIG. 5, the registration application screen includes an input field 310 for entering a login password, and a request button 320, for example. By inputting a login password and operating the request button 320, the user can log in to a prescribed website to issue a registration application to the server 100. The website stores the user's address, identification information for the printing device 200, and identification information for the terminal device 300 in association with each other as user information, and the registration application includes the identification information for the printing device 200 and the identification information for the terminal device 300.

In S20 of FIG. 4, the server 100 receives the registration application from the terminal device 300. The process of S20 is an example of the receiving in (e) of the present disclosure.

In S30 the server 100 registers the printing device 200 by associating information indicating the billing mode with the identification information for the printing device 200 according to the registration application received in S20. Consequently, the billing mode is also associated with the identification information for the terminal device 300 associated with the identification information for this printing device 200. The process of S30 is an example of the registering in (f) of the present disclosure.

After registering the printing device 200 in S30, in S40 the server 100 transmits a mode switching instruction to the printing device 200 for switching the printing device 200 to the billing mode. The process of S40 is an example of the transmitting in (g) of the present disclosure.

In S50 the printing device 200 receives the mode switching instruction that is transmitted from the server 100 in S40. The process of S50 is an example of the receiving in (h) of the present disclosure.

In S60 the printing device 200 switches the operating mode from the non-billing mode to the billing mode on the basis of the mode switching instruction received in S50. The process of S60 is an example of the switching in (i) of the present disclosure.

In S70 the printing device 200 sets a billing flag to ON for indicating that the printing device 200 has been switched to the billing mode. The billing flag is stored in the storage unit 215 as the data 230, for example.

Figure 9:
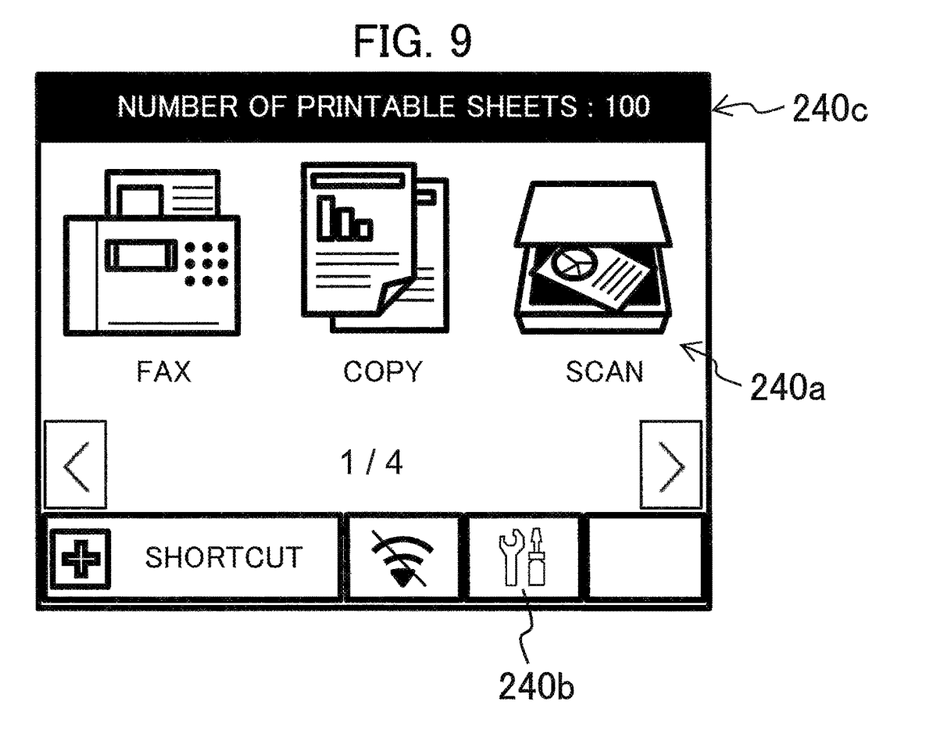
FIG. 9 is an explanatory diagram illustrating an example of a print screen displayed on a display unit when the printing device performs the billed printing process.

In S80 the printing device 200 switches the screen display from a display for the non-billing mode to a display for the billing mode. FIG. 9 illustrates an example of a screen displayed on the display unit 240 when the printing device 200 is in the billing mode and special ink cartridges 285 are mounted in the printing device 200. As illustrated in FIG. 9, the screen includes a plurality of icons 240a representing the functions fax, copy, scan, etc.; a settings icon 240b; and the like. An indicator field 240c at the top of the screen displays a value for the number of printable sheets in real-time. The number of printable sheets displayed in the example of FIG. 9 is 100, but 0 is initially displayed in the indicator field 240c until the user purchases the number of printable sheets. Note that this screen does not display ink icons indicating the amount of residual ink in each of the ink cartridges 285.

Figure 10:
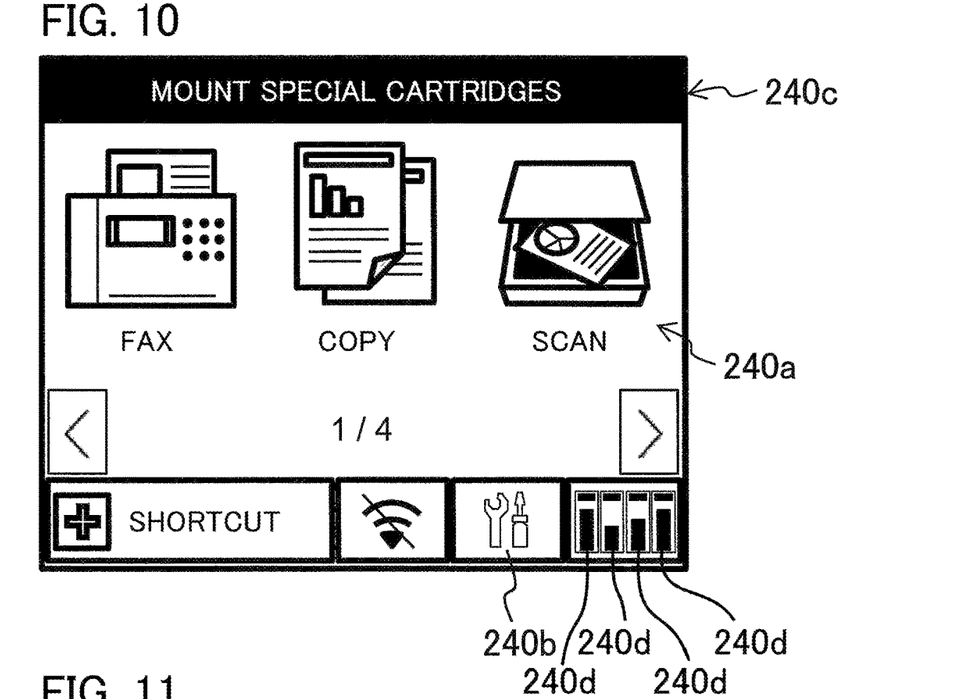
FIG. 10 is an explanatory diagram illustrating an example of a print screen displayed on the display unit when the printing device performs the normal printing process.

On the other hand, when the printing device 200 is in the billing mode but normal ink cartridges 285 are mounted in the printing device 200, the screen in the example of FIG. 10 is displayed on the display unit 240. The example of the screen illustrated in FIG. 10 is displayed when the control unit 210 of the printing device 200 reaches a NO determination in S140 of FIG. 6 described later. In the screen illustrated in FIG. 10, the number of printable sheets is no longer displayed in the indicator field 240c but is replaced with a message prompting the user to replace the normal ink cartridges 285 with special ink cartridges 285. This screen also includes four ink icons 240d indicating the residual quantity of ink for each color in the four normal ink cartridges 285.

Thus, when in the billing mode, the printing device 200 determines whether the ink cartridges mounted in the printing device 200 are special ink cartridges 285 or normal ink cartridges 285 and switches the display between the screens of FIGS. 9 and 10 on the basis of the type of mounted cartridges. The screen illustrated in FIG. 9 is an example of the first screen of the present disclosure, and the screen illustrated in FIG. 10 is an example of the second screen of the present disclosure. The process of S80 is an example of the displaying in (j) of the present disclosure.

This completes the description of the flowchart in FIG. 4. However, the printing device 200 may also display a notification on the display unit 240 to indicate that the mode of the printing device 200 is now in the billing mode or may transmit such a notification to be displayed on the display of the terminal device 300. Upon confirming that the printing device 200 is set to the billing mode, the user can issue a request through the terminal device 300 to purchase a number of printable sheets. Further, once the printing device 200 has been set to the billing mode, the server 100 performs a process to ship special ink cartridges 285 to the address of the user who owns the printing device 200.

Figure 11:
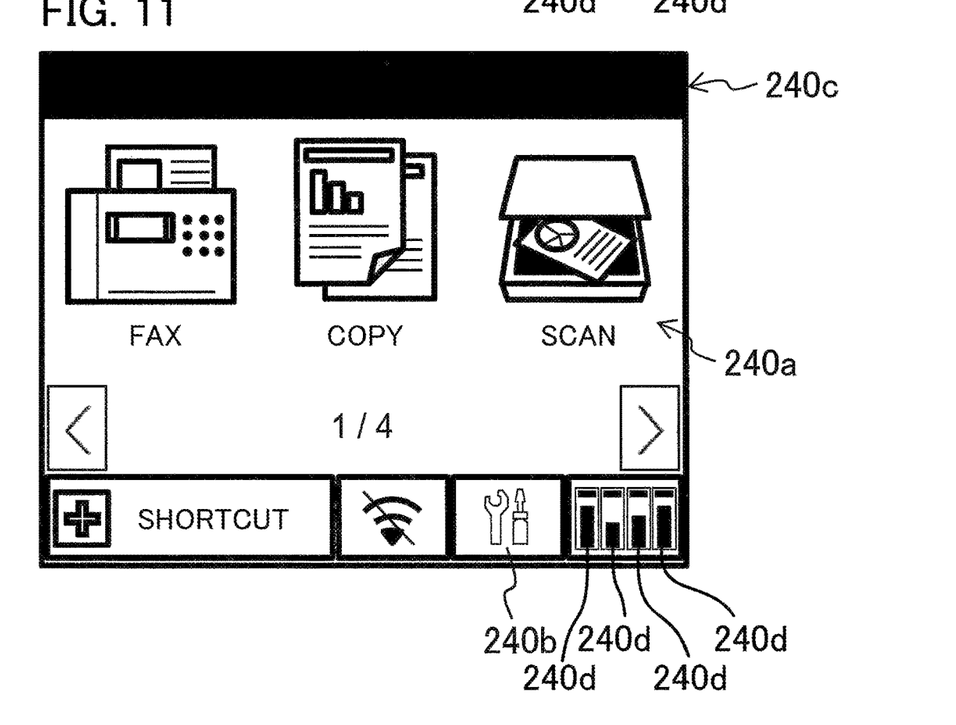
FIG. 11 is an explanatory diagram illustrating another example of the print screen displayed on the display unit when the printing device performs the normal printing process.

While the user can switch the printing device 200 to the billing mode by performing the registration described above, the user can similarly return the printing device 200 to the non-billing mode by cancelling the registration. In this case, in S60 of FIG. 4 the printing device 200 switches the operating mode from the billing mode to the non-billing mode in response to a mode switching instruction received from the server 100. The printing device 200 also sets the billing flag to OFF in S70. The billing flag is stored in the storage unit 215 as the data 230, for example. Next, the printing device 200 switches the displayed screen from the display for the billing mode (FIG. 9 or 10) to the display for the non-billing mode (FIG. 11). FIG. 11 illustrates an example of a screen displayed on the display unit 240 when the printing device 200 is in the non-billing mode. In the display screen of FIG. 11, nothing is displayed in the indicator field 240c, but four ink icons 240d are displayed to indicate the residual quantity of ink for each color in the four normal ink cartridges 285. The process of S60 and S70 is an example of the setting in (a) of the present disclosure.

<Control Procedure>

Figure 6:
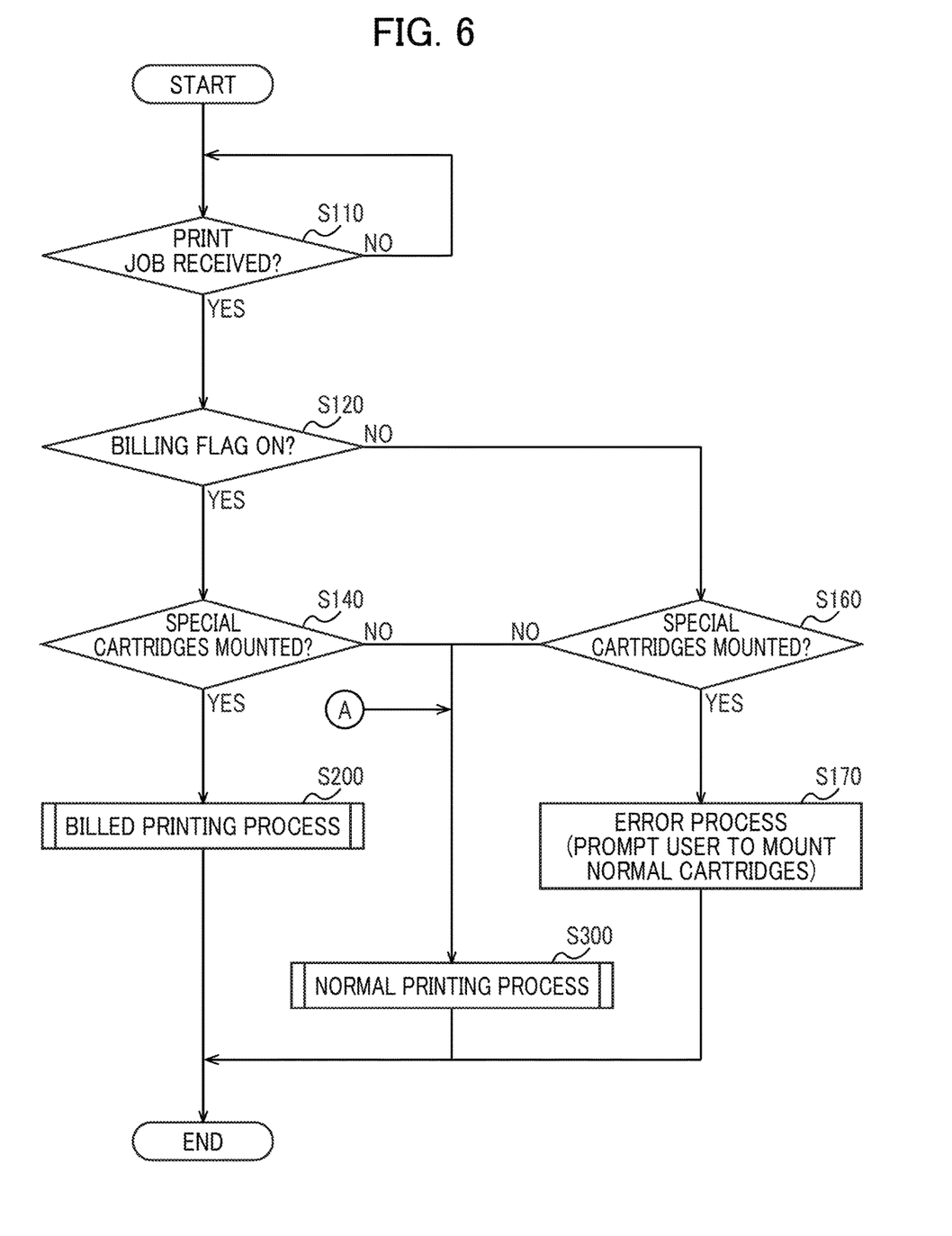
FIG. 6 is a flowchart illustrating steps in a control procedure executed by a control unit of the printing device.
Figure 7:
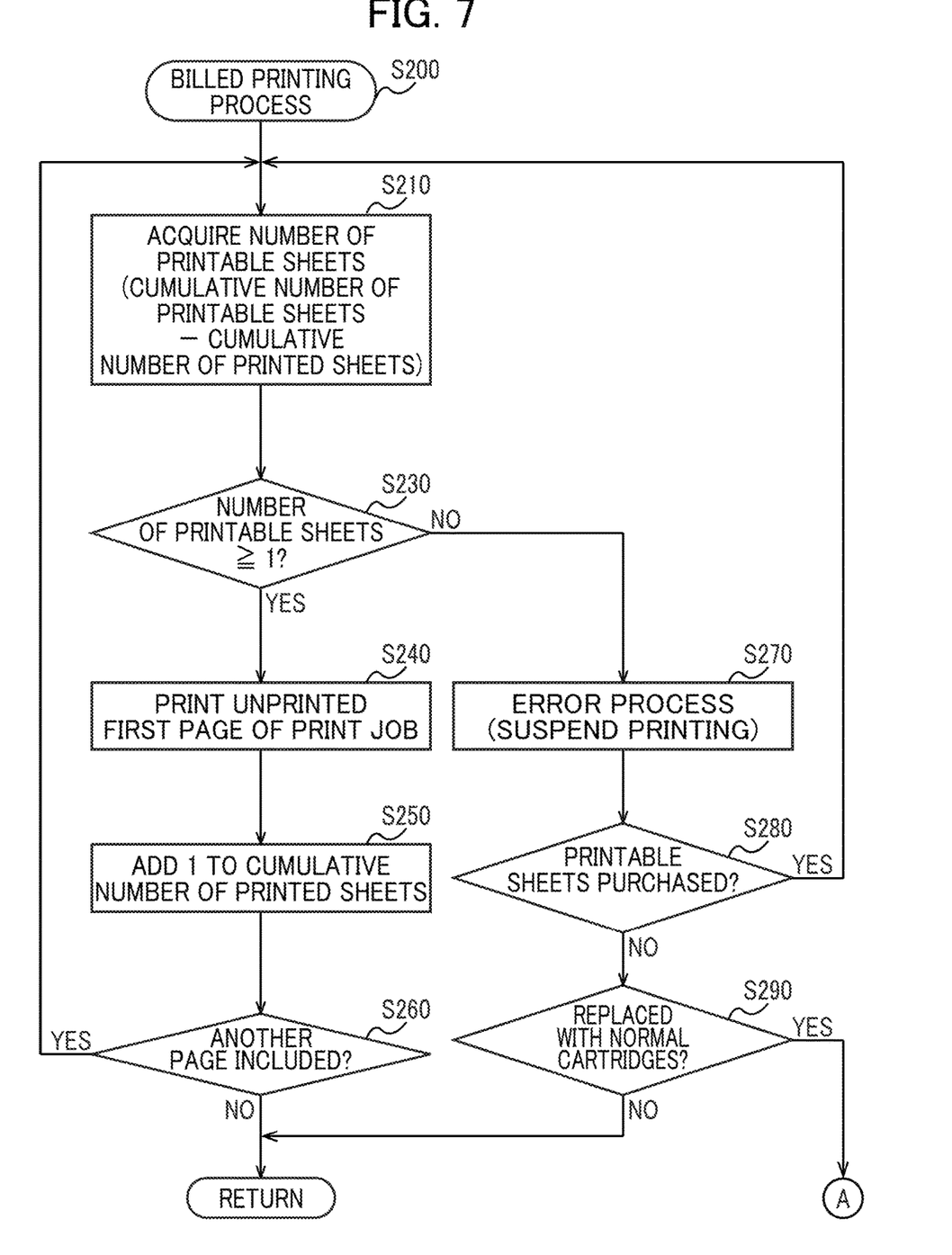
FIG. 7 is a flowchart illustrating steps in a billed printing process executed by the control unit of the printing device.
Figure 8:
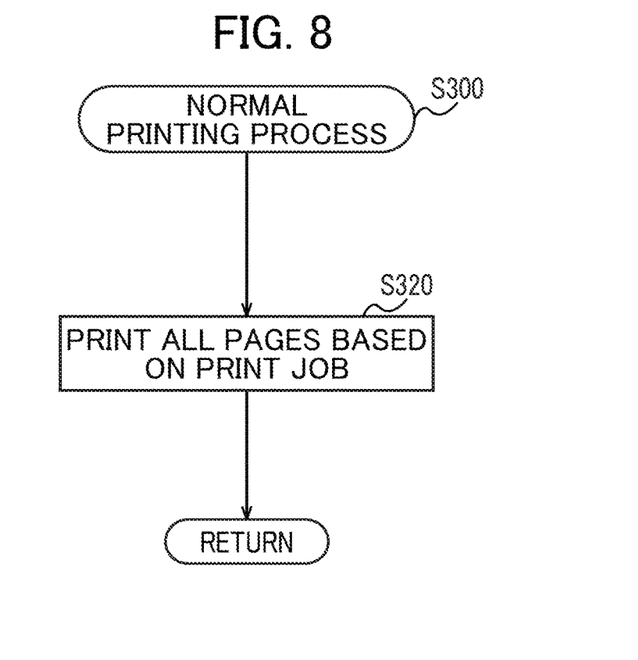
FIG. 8 is a flowchart illustrating steps in a normal printing process executed by the control unit of the printing device.

FIGS. 6 through 8 illustrate an example of a control procedure executed by the control unit 210 of the printing device 200.

In S110 of FIG. 6, the control unit 210 determines whether a print job has been received. The control unit 210 may receive print jobs from the terminal device 300 or from the operating unit 250 of the printing device 200. The control unit 210 waits at step S110 while a print job has not been received (S110: NO). Once a print job is received (S110: YES), the control unit 210 advances to S120.

In S120 the control unit 210 determines whether the billing flag stored in the storage unit 215 is ON. When the billing flag is ON (S120: YES), the control unit 210 advances to S140.

In S140 the control unit 210 determines on the basis of detection results from the cartridge sensors 290 whether each of the types of ink cartridges 285 held in the cartridge holders 280 is the special type used for the billing mode. Specifically, each cartridge sensor 290 reads information from the IC chip mounted on the ink cartridge 285 held in the corresponding cartridge holder 280 and outputs this information to the control unit 210, for example. The control unit 210 determines whether this information indicates the special cartridge. When any one of the information read from the IC chips mounted on the four ink cartridges 285 for respective four ink colors indicates the special cartridge, the control unit 210 determines that the read information indicates the special ink cartridges (S140: YES), and advances to S200. When all the information read from the IC chips mounted on the four ink cartridges 285 for respective four ink colors indicates the normal cartridge, on the other hand, the control unit 210 determines that the read information indicates the normal cartridges (S140: NO), and advances to S300.

In S200 the control unit 210 executes a billed printing process, which is a printing process performed in the billing mode. In other words, when the billing mode has been set in S60 and S70 described above and the read information is determined to indicate that at least one of the types of the ink cartridges 285 held in the cartridge holders 280 is the special type, the control unit 210 executes a printing operation in S200 that consumes (i.e., decrements) the number of printable sheets available to the user. The billed printing process will be described later in detail. Thereafter, the control unit 210 ends the process in FIG. 6.

On the other hand, when the read information is determined to indicate that each of the types of ink cartridges 285 held in the cartridge holders 280 is not the special type, i.e., when the read information is determined to indicate that normal ink cartridges 285 are held in the cartridge holders 280 (S140: NO), the control unit 210 advances to S300. In this case, the control unit 210 also displays a screen (see FIG. 10) on the display unit 240 prompting the user to mount special cartridges.

In S300 the control unit 210 executes a normal printing process, which is a printing process performed in the non-billing mode. In other words, when the billing mode has been set in S60 and S70 described above but the control unit 210 determines that the type of ink cartridges 285 held in the cartridge holder 280 is the normal type rather than the special type, the control unit 210 performs a printing operation in S300 that does not consume (i.e., does not decrement) the number of printable sheets. This normal printing process will be described later in detail. Thereafter, the control unit 210 ends the process in FIG. 6.

When the control unit 210 determines in S120 that the billing flag is OFF (S120: NO), the control unit 210 advances to S160.

In S160 the control unit 210 determines on the basis of the detection results from the cartridge sensor 290 whether the type of ink cartridges 285 held in the cartridge holder 280 is the special type used for the billing mode. The determination method is the same as the process of S140 described above. When any one of the information read from the IC chips mounted on the four ink cartridges 285 indicates the special cartridge, the control unit 210 determines that the read information indicates special ink cartridges 285 (S160: YES), and advances to S170.

In S170 the control unit 210 executes an error process. In the error process, the control unit 210 performs processes for displaying a message or the like for prompting the user to replace the special cartridges with normal cartridges, for example. Subsequently, the control unit 210 ends the process in FIG. 6.

On the other hand, when all the information read from the IC chips mounted on the four ink cartridges 285 for respective four ink colors indicates normal cartridges, the control unit 210 determines that the information indicates that the type of ink cartridges 285 held in the cartridge holder 280 are not the special type but the normal type (S160: NO), and advances to S300. In S300 the control unit 210 executes a normal printing process, which is a printing process performed in the non-billing mode. Subsequently, the control unit 210 ends the process in FIG. 6. The process of S300 performed when a NO determination is made in S160 after a NO determination is made in S120 is an example of the executing in (b) of the present disclosure.

FIG. 7 illustrates an example of the detail of the billed printing process in S200. In S210 of FIG. 7, the control unit 210 acquires the value for the number of printable sheets, which includes any newly purchased number of printable sheets paid for by the user. As described above, the number of printable sheets is the value obtained by subtracting the cumulative number of printed sheets from the cumulative number of printable sheets. The control unit 210 may acquire the number of printable sheets found through a calculation on the server 100 or may calculate the number of printable sheets based on the cumulative number of printable sheets acquired from the server 100 and the cumulative number of printed sheets counted by the control unit 210 itself. The process of S210 is an example of the acquiring in (c) of the present disclosure.

In S230 the control unit 210 determines whether the number of printable sheets acquired in S210 is equal to or greater than one. When the number of printable sheets is one or greater (S230: YES), the control unit 210 advances to S240.

In S240 the control unit 210 prints the unprinted first page of the print job.

In S250 the control unit 210 adds one to the cumulative number of printed sheets stored in the database DB3.

In S260 the control unit 210 determines whether the print job received in S110 includes another page. When the print job includes another page (S260: YES), the control unit 210 returns to S210. However, when the print job does not include another page (S260: NO), the control unit 210 ends the subroutine of FIG. 7 and returns to the flowchart of FIG. 6.

The control unit 210 continues the printing process in S210 through S260 described above according to the received print job while consuming ink from the ink cartridges 285 until the number of printable sheets acquired in S210 reaches zero. The process in S210 through S260 is an example of the executing in (e) of the present disclosure, and zero is an example of the predetermined quantity of the present disclosure. The printing operation is an example of the prescribed operation of the present disclosure. The predetermined quantity may be a predetermined value greater than or equal to one.

When the number of printable sheets is zero in S230 (S230: NO), the control unit 210 advances to S270.

In S270 the control unit 210 executes an error process. In the error process, the control unit 210 suspends printing and performs a process to display a message asking whether the user wishes to purchase an additional number of printable sheets or a message prompting the user to replace the special cartridges with normal cartridges, for example.

In S280 the control unit 210 determines whether the user has purchased an additional number of printable sheets. Specifically, the control unit 210 waits for information to be transmitted from the server 100 and, when the transmitted information includes the cumulative number of printable sheets or a newly purchased number of printable sheets, determines that an additional number of printable sheets have been purchased. When the user has purchased an additional number of printable sheets and has performed an operation to resume printing (S280: YES), the control unit 210 returns to S210. Since the newly acquired number of printable sheets is equal to or greater than one in this case, the control unit 210 reaches a YES determination in S230 and resumes printing.

As described above, when the value for the number of printable sheets reaches zero during the printing process for a print job while special ink cartridges 285 are held in the cartridge holder 280 and the printing device 200 is in the billing mode, the control unit 210 suspends the printing operation. When the number of printable sheets subsequently acquired in S210 includes a newly purchased number of printable sheets paid for by the user through operations on the terminal device 300, the control unit 210 resumes the printing operation while decrementing the number of printable sheets.

On the other hand, when the user has not purchased an additional number of printable sheets in S280 (S280: NO), in S290 the control unit 210 determines whether the special ink cartridges 285 held in the cartridge holder 280 have been replaced with normal ink cartridges 285. When the special ink cartridges 285 have been replaced with normal ink cartridges 285 (S290: YES), the control unit 210 advances to the normal printing process in S300 of FIG. 6. However, when the special ink cartridges 285 have not been replaced with normal ink cartridges 285 (S290: NO), the control unit 210 ends the subroutine of FIG. 7 and returns to the flowchart in FIG. 6.

As described above, when the value for the number of printable sheets reaches zero during the printing process for a print job while special ink cartridges 285 are held in the cartridge holder 280 and the printing device 200 is in the billing mode, the control unit 210 suspends the printing operation. When the special ink cartridges 285 in the cartridge holder 280 are replaced with normal ink cartridges 285, the control unit 210 resumes the printing operation without decrementing the number of printable sheets.

FIG. 8 illustrates an example of the detail of the normal printing process in S300. In S320 of FIG. 8, the control unit 210 prints all pages based on the print job received in S110.

Subsequently, the control unit 210 ends the subroutine of FIG. 8 and returns to the flowchart in FIG. 6.

Effects of the Embodiment

The printing device 200 of the present embodiment is provided with a billing mode and a non-billing mode. In the billing mode, the printing device 200 performs printing operations while consuming ink in the special ink cartridges 285 until the number of printable sheets corresponding to the purchased number of printable sheets paid for by the user reaches zero. In the non-billing mode, the printing device 200 performs printing operations while consuming ink in the normal ink cartridges 285 irrespective of the number of printable sheets.

In the embodiment described above, a setting for determining whether the printing device 200 will operate in the billing mode or the non-billing mode is configured in steps S60 and S70. Thus, the above embodiment can switch the operating mode from the non-billing mode for printing without any financial burden to the user to the billing mode for printing up to the number of printable sheets that the user has purchased, thereby improving user convenience.

Another feature of the embodiment described above is that the printing device 200 performs printing operations that decrement the number of printable sheets when the printing device 200 is set to the billing mode on the condition that special ink cartridges 285 designed for the billing mode are mounted in the printing device 200. Thus, the present embodiment prevents the user from being mistakenly charged when normal ink cartridges 285, such as commercially available ink cartridges, are mounted in the printing device 200.

Another feature of the present embodiment is that, even if a printing operation is suspended due to the number of printable sheets reaching zero as the number of printable sheets is decremented in the billing mode, the printing operation is resumed when the special ink cartridges 285 for use in the billing mode are replaced with normal ink cartridges 285 not for use in the billing mode. Upon resumption, the printing operation is continued without decrementing the number of printable sheets. Thus, by mounting commercial ink cartridges 285 in the printing device 200, for example, the user can continue printing, even though the number of printable sheets is insufficient for printing the entire job in the billing mode.

Another feature of the present embodiment is that, even if a printing operation is suspended due to the number of printable sheets reaching zero as the number of printable sheets is decremented in the billing mode, the printing operation is resumed when the user purchases an additional number of printable sheets through operations on the terminal device 300 and the printing device 200 acquires the new number of printable sheets to which the purchased number of printable sheets has been added. Upon resumption, the printing operation is continued while decrementing this new number of printable sheets. Thus, even if the available number of printable sheets is insufficient for printing the entire job, the user can resume printing by purchasing an additional number of printable sheets via the terminal device 300, for example.

Another feature of the present embodiment described above is that the printing device 200 can perform printing operations without decrementing the number of printable sheets while set to the billing mode on the condition that normal ink cartridges 285 not for use in the billing mode are mounted in the printing device 200. Thus, the present embodiment can prevent the user from being accidentally billed when commercially available ink cartridges 285, for example, are mounted in the printing device 200.

Another feature of the present embodiment is that in S80 the printing device 200 displays the number of printable sheets while set to the billing mode. Thus, the present embodiment can notify the user of the number of printable sheets available for printing while in the billing mode by properly displaying information indicating the remaining number of printable sheets.

Another feature of the present embodiment is that the value for the number of printable sheets is displayed only when the printing device 200 is set to the billing mode and the number of printable sheets are decremented, i.e., when special ink cartridges 285 designed for the billing mode are mounted in the cartridge holder 280. The value for the number of printable sheets is not displayed while normal ink cartridges 285 are mounted in the cartridge holder 280 and the number of printable sheets is not being decremented. Thus, the present embodiment can perform an appropriate display based on the state of the printing device 200, including the mode setting and the type of ink cartridges 285 mounted therein.

Another feature of the present embodiment is that when the user of the printing device 200 wishes to change the operating mode of the printing device 200 from the non-billing mode to the billing mode, the user can transmit a registration application to the server 100 through the terminal device 300. When the server 100 receives the registration application in S20 of FIG. 4, in S30 the server 100 registers the printing device 200 by associating information indicating the billing mode with the identification information for the printing device 200. Once registration is completed, in S40 the server 100 transmits a mode switching instruction to the printing device 200. In response to the mode switching instruction received in S50, in S60 the printing device 200 switches the operating mode from the non-billing mode to the billing mode.

According to the embodiment described above, the user can easily and smoothly switch the printing device 200 from the non-billing mode to the billing mode simply by performing operations on the terminal device 300. By performing the registration process in S30, the server 100 can recognize that the mode of the printing device 200 has been switched and can reliably manage the printing device 200.

Variations of the Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The above description of a printing device that executes printing operations while consuming ink cartridges is one example of the consuming device that performs a prescribed operation while consuming a consumable, but the subject of the present disclosure is not limited to an inkjet printing device. For example, the disclosure may be applied to a laser printing device that consumes toner, a thermal transfer printing device that consumes ink ribbon, or a thermal printing device that consumes thermal paper. In the above description, cartridge holders 280 serve as an example of the holder, and ink cartridges serve as an example of the consumables, but the holder may be a tank that can hold colorant, and the consumable may be the colorant that is injected into the tank from a bottle. The colorant may include colorant in the respective colors cyan, magenta, yellow, and black, for example. In this case, the user can assist the printing device 200 in determining the type of colorant by inputting or having the printing device 200 read identification information for the colorant that is attached to the bottle of colorant. Consumables may also be paper, rollers that convey the paper, developing devices, and fixing devices. The present disclosure may also be applied to devices other than printing devices, such as fax machines, scanners, or multifunction peripherals possessing a combination of these functions plus a printing function.

In the above description, the number of printable sheets is used as an example of the permitted printing quantity or permitted consumption quantity, but the permitted printing quantity or permitted consumption quantity may include the length of the sheets or the amounts of colorants in addition to the number of printable sheets.

In the above description, a printing operation is performed while decrementing the number of printable sheets on condition that the printing device 200 is set to the billing mode and that special ink cartridges 285 are mounted therein, but the number of printable sheets may be decremented at all times when the printing device 200 is set to the billing mode, irrespective of the type of cartridges mounted in the printing device 200.

In the above description, when any one of the information read from the IC chips mounted on the ink cartridges 285 for respective ink colors indicates the special cartridge, the control unit 210 determines that the information indicates the special cartridges, but the present disclosure is not limited to this. The control unit 210 may determine that the information read from the IC chips mounted on the ink cartridges 285 for respective ink colors indicate the special cartridges only when all the information indicates the special cartridges. The control unit 210 may then determine that the information read from the IC chips mounted on the ink cartridges 285 for respective ink colors indicate the normal cartridges when any one of the information indicates the normal cartridge.

The sequence chart illustrated in FIG. 4 and the flowcharts illustrated in FIGS. 6 through 8 in the above description do not limit the present disclosure to the steps indicated therein. Steps may be added or deleted, or their order may be rearranged, without departing from the spirit and technical ideas of the disclosure.

In addition to what has already been described, the methods according to the embodiment and its variations described above may be used in suitable combinations.

In addition, although not illustrated individually, the present disclosure may be implemented with various modifications without departing from the spirit of the disclosure.

What is claimed is:

1. A consuming device comprising:
a holder configured to hold therein a consumable;
a display; and
a controller,
wherein the consuming device is operable in an operating mode, the operating mode being switchable between a billing mode in which the consuming device can consume the consumable within a permitted consumption quantity and a non-billing mode in which the consuming device can consume the consumable without any restriction imposed by the permitted consumption quantity,
wherein the controller is configured to perform:
(a) setting the operating mode to one of the billing mode and the non-billing mode;
when the operating mode is set to the non-billing mode in (a):
(b) executing, in response to receiving an execution instruction, a prescribed operation consuming the consumable, the prescribed operation being executed in (b) while consuming the consumable irrespective of the permitted consumption quantity without decreasing the permitted consumption quantity;
when the operating mode is set to the billing mode in (a):
(c) acquiring the permitted consumption quantity including a newly purchased consumption quantity paid for by a user;
(d) displaying the permitted consumption quantity on the display; and
(e) executing, in response to receiving the execution instruction, the prescribed operation, the prescribed operation being executed in (e) while consuming the consumable and decreasing the permitted consumption quantity acquired in (c) until the decreased permitted consumption quantity reaches a predetermined quantity, and
wherein when the operating mode is set to the non-billing mode in (a), the controller does not display the permitted printing quantity on the display.

2. The consuming device according to claim 1,
wherein the consuming device is a printing device configured to consume a printing consumable as the consumable,
wherein in (b) the controller executes a printing operation as the prescribed operation, the printing operation being executed in (b) while consuming the printing consumable irrespective of a permitted printing quantity as the permitted consumption quantity,
wherein in (c) the controller acquires the permitted printing quantity including, as the newly purchased consumption quantity, a newly purchased printing quantity paid for by the user,
wherein in (d) the controller displays the permitted printing quantity on the display, and
wherein in (e) the controller executes the printing operation, the printing operation being executed in (e) while consuming the printing consumable and decreasing the permitted printing quantity until the decreased permitted printing quantity reaches the predetermined quantity.

3. The consuming device according to claim 2,
wherein when the operating mode is set to the billing mode in (a) and a type of the printing consumable held in the holder is a special type used for the billing mode, the controller executes the printing operation in (e) while consuming the printing consumable within the permitted printing quantity.

4. The consuming device according to claim 3,
wherein the controller is configured to further perform:

when the permitted printing quantity reaches the predetermined quantity during the printing operation being executed in (e):
(f) suspending the printing operation; and
(g) resuming, in response to another printing consumable whose type is not the special type being newly held in the holder, the printing operation while consuming the printing consumable irrespective of the permitted printing quantity without decreasing the permitted printing quantity.

5. The consuming device according to claim 3,
wherein the controller is configured to further perform:
when the permitted printing quantity reaches the predetermined quantity during the printing operation being executed in (e):
(f) suspending the printing operation;
(g) acquiring, in response to a newly purchased printing quantity being purchased through an operation on a terminal device of the user, the permitted printing quantity including the newly purchased printing quantity; and
(h) resuming, in response to acquiring the permitted printing quantity in (g), the printing operation while consuming the printing consumable and decreasing the permitted printing quantity acquired in (g) until the decreased permitted printing quantity reaches the predetermined quantity.

6. The consuming device according to claim 3,
wherein when the type of the printing consumable held in the holder is the special type, the controller displays on the display a first screen including the permitted printing quantity in (d), and
wherein when the type of the printing consumable held in the holder is not the special type, the controller displays on the display a second screen not including the permitted printing quantity in (d).

7. The consuming device according to claim 2,
wherein when the operating mode is set to the billing mode in (a) and a type of the printing consumable held in the holder is not a special type used for the billing mode, the controller executes the printing operation in (e) while consuming the printing consumable without decreasing the permitted printing quantity.

8. The consuming device according to claim 1,
wherein when the operating mode is set to the billing mode in (a) and a type of the consumable held in the holder is a special type for the billing mode, the controller displays on the display a screen including the permitted consumption quantity in (d).

9. The consuming device according to claim 8,
wherein when the operating mode is set to the billing mode in (a) and the type of the consumable held in the holder is not the special type, the controller does not display on the display the screen including the permitted consumption quantity in (d).

10. A consumption management system comprising:
a server; and
a consuming device comprising:
a holder configured to hold therein a consumable;
a display; and
a controller,
wherein the consuming device is operable in an operating mode, the operating mode being switchable between a billing mode in which the consuming device can consume the consumable within a permitted consumption quantity and a non-billing mode in which the consuming device can consume the consumable without any restriction imposed by the permitted consumption quantity,
wherein the controller of the consuming device is configured to perform:
(a) setting the operating mode to one of the billing mode and the non-billing mode;
when the operating mode is set to the non-billing mode in (a):
(b) executing, in response to receiving an execution instruction, a prescribed operation consuming the consumable, the prescribed operation being executed in (b) while consuming the consumable irrespective of the permitted consumption quantity without decreasing the permitted consumption quantity;
when the operating mode is set to the billing mode in (a):
(c) acquiring the permitted consumption quantity including a newly purchased consumption quantity paid for by a user;
(d) displaying the permitted consumption quantity on the display; and
(e) executing, in response to receiving the execution instruction, the prescribed operation, the prescribed operation being executed in (e) while consuming the consumable and decreasing the permitted consumption quantity acquired in (c) until the decreased permitted consumption quantity reaches a predetermined quantity, and
wherein when the operating mode is set to the non-billing mode in (a), the controller of the consuming device does not display the permitted consumption quantity on the display.

11. The consumption management system according to claim 10, further comprising:
a terminal device,
wherein the server is configured to perform:
(f) receiving a registration application from the terminal device, the registration application requesting to use the consuming device in the billing mode;
(g) registering the consuming device by associating information indicating the billing mode with identification information for the consuming device; and
(h) transmitting, after the registering in (g), a mode switching instruction to the consuming device for switching the operating mode of the consuming device to the billing mode, and
wherein the controller of the consuming device is configured to further perform:
(i) receiving the mode switching instruction transmitted in (h); and
(J) switching, in response to the mode switching instruction received in (i), the operating mode from the non-billing mode to the billing mode.

12. A non-transitory computer-readable storage medium storing a set of computer-readable instructions for controlling a printing device, the printing device including: a holder configured to hold therein a printing consumable; a display; and a computer, the printing device being operable in an operating mode, the operating mode being switchable between a billing mode in which the printing device can consume the printing consumable within a permitted printing quantity and a non-billing mode in which the printing device can consume the printing consumable without any restriction imposed by the permitted printing quantity, the set of computer-readable instructions, when executed by the computer, causing the printing device to perform:
- (a) setting the operating mode to one of the billing mode and the non-billing mode;

when the operating mode is set to the non-billing mode in (a):
- (b) executing, in response to receiving an execution instruction, a printing operation consuming the printing consumable, the printing operation being executed in (b) while consuming the printing consumable irrespective of the permitted printing quantity without decreasing the permitted printing quantity;

when the operating mode is set to the billing mode in (a):
- (c) acquiring the permitted printing quantity including a newly purchased printing quantity paid for by a user;
- (d) displaying the permitted printing quantity on the display; and
- (e) executing, in response to receiving the execution instruction, the printing operation, the printing operation being executed in (e) while consuming the printing consumable and decreasing the permitted printing quantity acquired in (c) until the decreased permitted printing quantity reaches a predetermined quantity, and wherein when the operating mode is set to the non-billing mode in (a), the printing device does not display the permitted consumption quantity on the display.

* * * * *